United States Patent [19]
Harle

[11] Patent Number: 5,944,362
[45] Date of Patent: Aug. 31, 1999

[54] FULL FLOW AND/OR LOCKING CONNECTOR/QUICK-DISCONNECT COUPLING

[75] Inventor: William Harle, West Salem, Ohio

[73] Assignee: Kat Mfg., Inc., West Salem, Ohio

[21] Appl. No.: 08/919,379

[22] Filed: Aug. 28, 1997

Related U.S. Application Data

[60] Provisional application No. 60/028,869, Sep. 3, 1996.

[51] Int. Cl.$^6$ ........................................ F16L 35/00
[52] U.S. Cl. .................. 285/148.14; 285/148.15; 285/87; 285/903; 292/166
[58] Field of Search ..................... 285/33, 34, 81, 285/82, 87, 148.2, 148.4, 238, 276, 312, 415, 420, 903, 148.13, 148.14, FOR 156, 148.15; 292/166

[56] References Cited

U.S. PATENT DOCUMENTS

| | | | |
|---|---|---|---|
| 4,222,593 | 9/1980 | Lauffenburger | 285/312 X |
| 4,372,587 | 2/1983 | Roche | 285/238 |
| 4,432,570 | 2/1984 | Kemppainen | 285/276 X |
| 4,688,833 | 8/1987 | Todd | 285/148.14 |
| 5,338,069 | 8/1994 | McCarthy | 285/312 X |
| 5,634,311 | 6/1997 | Carlton | 285/903 X |
| 5,722,697 | 3/1998 | Chen | 285/276 X |

FOREIGN PATENT DOCUMENTS 765724  8/1967  Canada .
0509970 A1  10/1992  European Pat. Off. ............... 285/903

*Primary Examiner*—Lynne Reichard
*Assistant Examiner*—Greg Binda
*Attorney, Agent, or Firm*—Christopher John Rudy

[57] ABSTRACT

Connector/coupling for connection of conduit has hollow housing, collar with internally-directed protrusion capable of engaging the conduit, and means for fastening the collar to the housing to hold these together. A quick-disconnect coupling includes receiving piece with hollow passageway, passage portion and receiving end; on the outside about the receiving end is generally cylindrical surface with a groove of a width and depth capable of receiving a stopping object, and a part of the object resides above the outside surface; a swivel collar has a generally cylindrical receiving piece mating surface with a groove therein of a width and depth capable of receiving at least a portion of the part of the stopping object which resides above the outside surface; a connect device holds a received piece to the receiving piece; and a stopping device is a part thereof. Inside-out cutting saw may be employed to cut the conduit, for example, PVC helical hose. Handle locking device includes a support; a lever handle, with an actuating end, pivotally mounted on the support; and a locking pin, which protrudes from the support and can be drawn back toward the support by activating the lever handle to cause its actuating end to draw back the pin, and which pin can protrude enough so as to extend over a lowered receiving handle of a coupling.

14 Claims, 5 Drawing Sheets

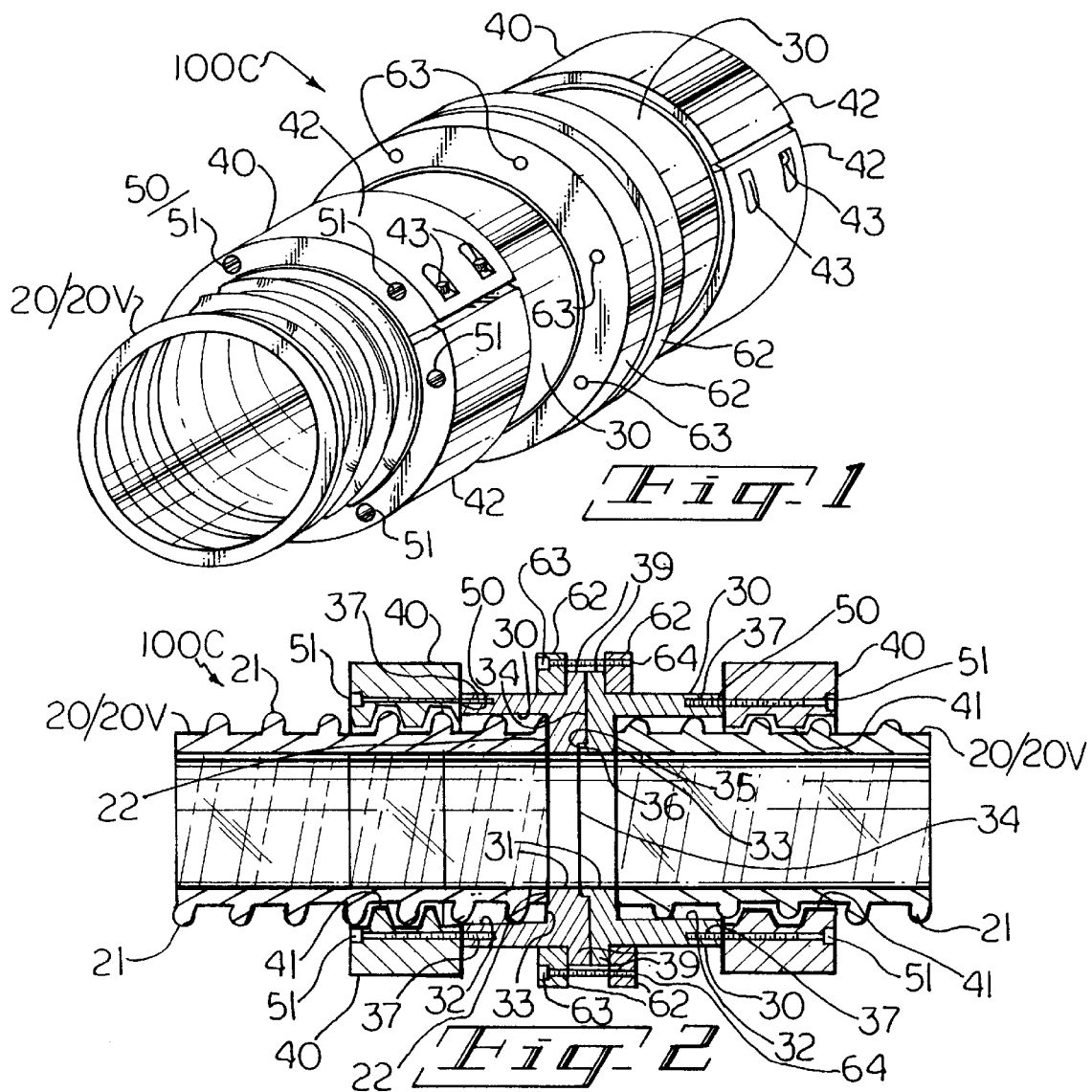

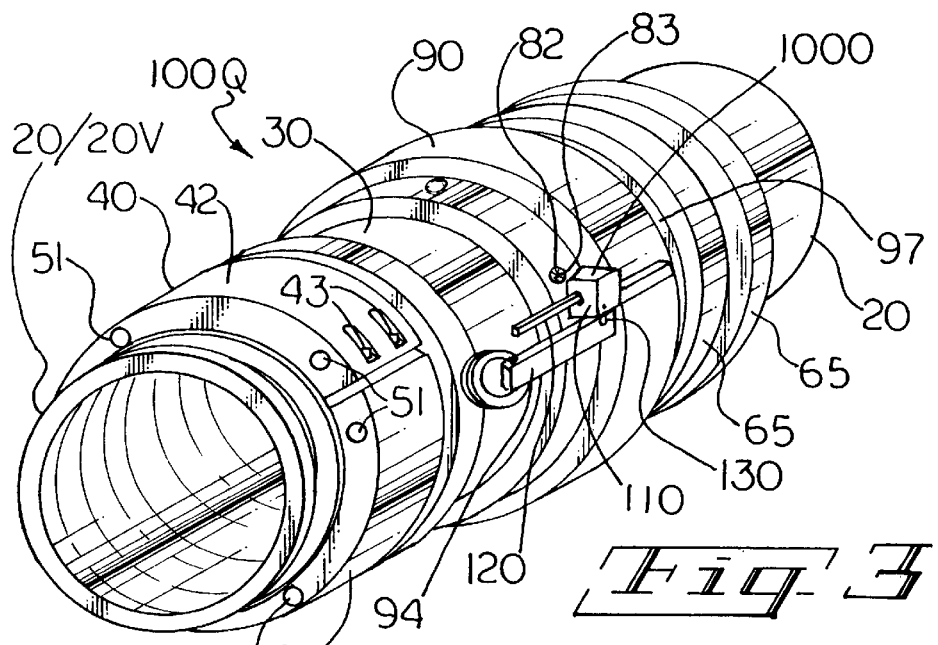
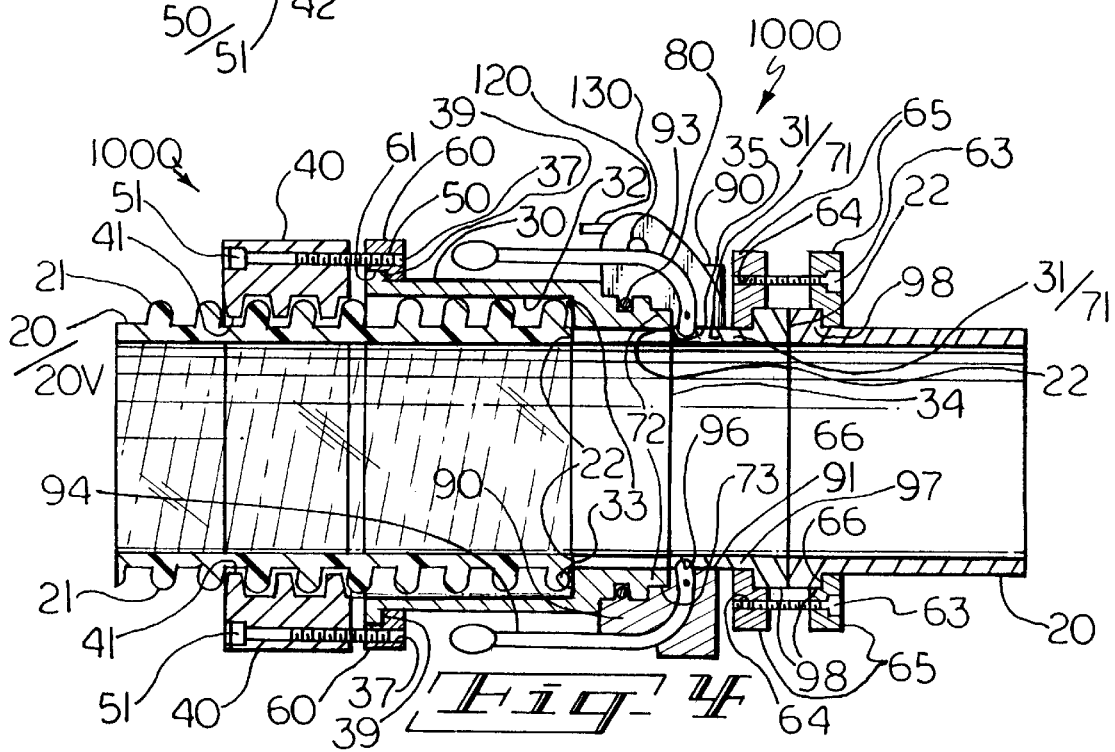

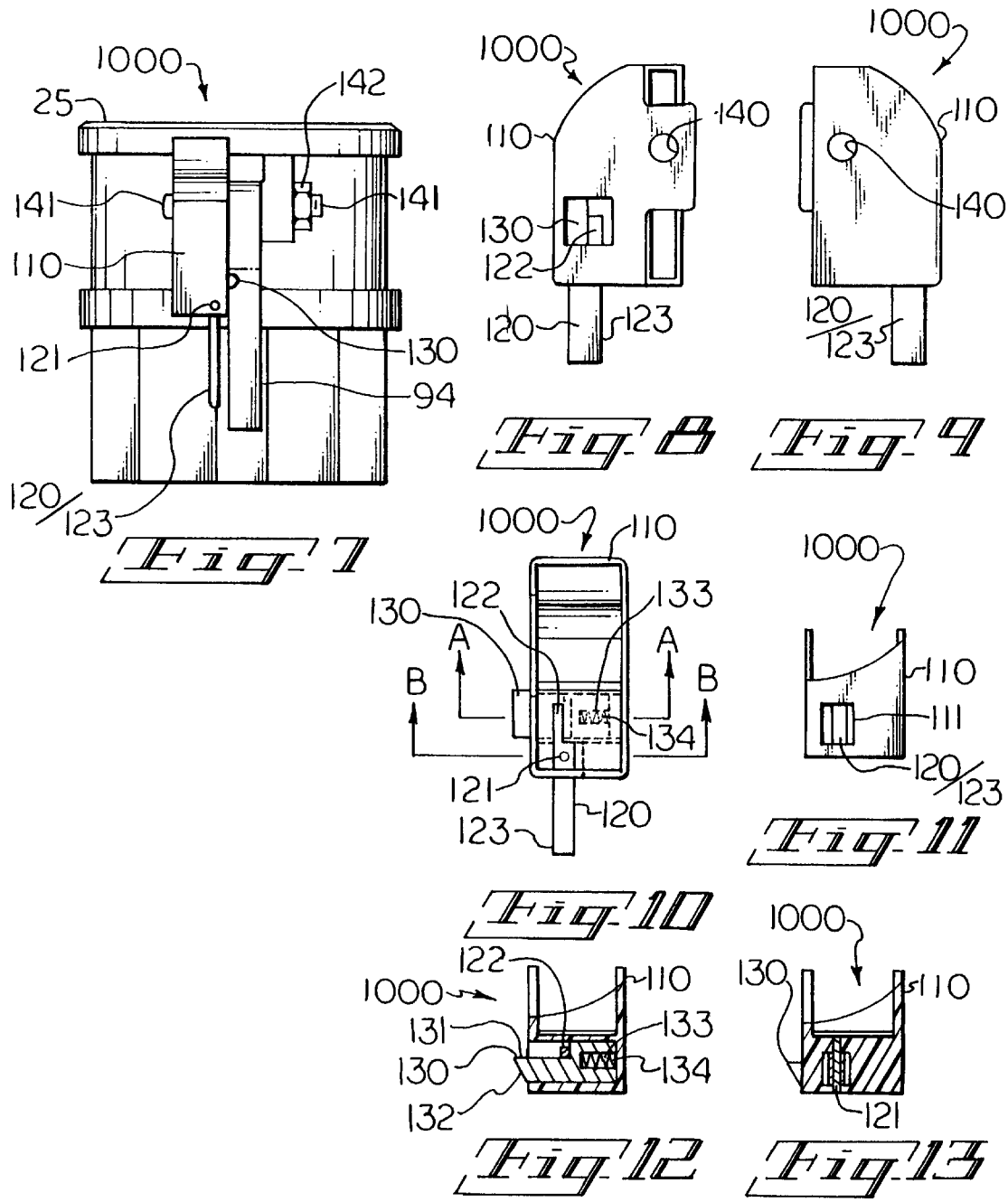

FULL FLOW AND/OR LOCKING CONNECTOR/QUICK-DISCONNECT COUPLING

DOMESTIC PRIORITY CLAIM

This claims priority based upon U.S. Provisional Application Ser. No. 60/028,869 filed on Sept. 3, 1996, as to subject matter disclosed therein.

FIELD

The present invention concerns a connector or a coupling useful in the transfer of bulk dry goods, liquids and gases; a safety device for coupling handles, and a hose saw.

BACKGROUND

Connectors and couplings for hoses, which are of various sizes and types, have been known for a long time. However, known, standard connectors and couplings may suffer from any of a number of drawbacks.

Connectability and throughput passageway constriction from a connector or coupling can be very problematical with larger-diameter ensembles, say, with four- to six-inch diameter hoses, which may carry bulk dry goods, liquids, etc. Traditionally, when a coupling is attached to a hose, the coupling is inserted into the hose, and a clamping device is attached to the outside of the hose to secure the three pieces (hose, coupling, and clamp) together. The notable exception to this is the sand blast coupling. Owing to the service in which it is used, sand blasting, this coupling must be changed frequently on the job so that the coupling is attached to the outside of the hose with a few wood screws so that the operator can change it quickly with a simple tool, a screw driver. However, with the advent of vinyl, e.g., polyvinyl chloride (PVC), hose, inserting the coupling presented problems such as those which follow:

1) PVC and metal have a rather high coefficients of friction, and this, along with the hose and coupling tolerances, makes it difficult to insert the coupling in the hose. Thus, it can be very difficult to even connect hoses when unbroken to standard couplings. Special tools and significant time are usually tried.

2) Inserting a stem into the hose puts an obstruction the thickness of the coupling stem into the inside of the hose. This coupling obstruction reduces the effective inside diameter of the hose, and creates a place of turbulence to the flow of the material where it meets this disturbance in its flow along the conduit, causing line clogs, slow downs, etc.

3) In food service applications, such a stem in the hose can allow for bacteria build up.

4) Because of bacteria build up, such a system should be cleaned frequently and the couplings removed for cleaning. This is difficult at best with a reusable coupling and impossible with a permanently attached coupling such as one attached by crimping or swaging of a ferrule.

Another drawback can concern difficulties encountered in repairing larger hoses broken on site. For example, with a broken, standard four-inch inside diameter helix-backed PVC hose such as used in food processing, and so forth, repair with known, standard connectors can be time-consuming and difficult, and may need to be performed off-site in a shop.

Another drawback can concern the problem of undesirable opening-up or releasing of the cam-and-groove clamping handles of quick-disconnect couplings, which can cause the coupling to become uncoupled, which may cause accidental injury or death from a thrashing, flowing hose, in addition to a loss of goods. Although certain handle restraining devices are known, such as wrap-around wires and such as the pin-insertion type of devices, these devices generally render the coupling more permanent in nature and not so quickly disconnectable, are incorporated into a non-standard manufacture, and/or are inapplicable to standard couplings.

Furthermore, one of the big problems involved in putting couplings on PVC helix hose is that it is difficult if not impossible to get a straight cut across the hose because of the helix, i.e., the cut is not orthogonal to the bore. A power horizontal saw can accomplish this, but such a saw is not available in most places where the helix hose is assembled or used, and there is great difficulty in putting a 40-foot length of hose in a power saw. In turn, hand saws —power or otherwise—are used; cutting across the helix is difficult, and a square cut most frequently is not obtained.

It would be desirable to overcome such difficulties.

SUMMARY

The present invention provides, in one embodiment, a connector/coupling for connection of conduit, comprising a hollow housing, a collar having an internally-directed protrusion capable of engaging the conduit, and a means for fastening the collar to the housing so as to hold the same together. In another embodiment, a quick-disconnect coupling for connection of conduit comprises a receiving piece having a hollow passageway for throughput of a substance, a passage portion and a receiving end, on the outside about the receiving end there being a generally cylindrical surface with a groove therein of a width and depth capable of receiving a stopping object, the same being such that a part of the object resides above the outside surface; a swivel collar having a generally cylindrical receiving piece mating surface with a groove therein of a width and depth capable of receiving at least a portion of the part of the stopping object which resides above the outside surface of the receiving piece, and a connect device capable of holding a received piece to the receiving piece; and the stopping device. Conduit can be pulled in an axial direction thus. In a further embodiment, a handle locking device comprises a support; a lever handle pivotally mounted on the support, the lever handle having an actuating end; and a locking pin, which protrudes from the support and can be drawn back toward the support by activating the lever handle so as to cause its actuating end to draw back the pin, the locking pin being capable of protruding enough so as to extend over a lowered receiving handle of a coupling. In a further related embodiment, provided is an inside-out hose saw useful for cutting helical hose, which comprises a frame, to which can be securely mounted a helical hose; a member attached to said frame, which can mount an arm such that the arm can be moved radially in relation to such hose; the arm, mounted on said member; a cutting device mounted on an outer extremity of the arm which can cut the hose in a circumferential manner from the inside of the hose.

The invention is useful in the transfer of goods through a conduit and/or increasing safety in operations therewith.

Significantly, by the invention, the aforementioned problems are ameliorated or overcome. In particular, the following is noted for specific embodiments of the invention especially, for example, with respect to use of PVC hose:

1) The connector/coupling does not go into the PVC hose, thus eliminating the problems involved in trying to push an oversized coupling into an undersized hose.

2) Because the connector/coupling is designed for the hose to go inside the connector/coupling, generally no obstruction is created, and therefore, there is no impediment to the flow of material inside. The connector/coupling is an effective full flow device. Thereby, flow can be increased over that which occurs from standard couplings, and production increased.

3) Because the connector/coupling is designed for the hose to go inside the connector/coupling, there are no obstructions caused by the connector/coupling stem wall. It does not have the problem of bacterial build up in food service applications, unlike the case with standard couplings with inserted stems.

4) Because the connector/coupling is designed for the hose to go inside the connector/coupling, one does not need to force a coupling stem inside the hose. It is easily assembled/disassembled, and cleanable. Accordingly, full flow of material can be maintained through conduits. As well, quick repair of conduit or hoses can be carried out on site. With the locking lever handle, safety of coupling connections can be maintained especially, for example, with cam-and-groove type couplings. A good, square hose cut can be provided by the inside-out hose saw.

Numerous further advantages attend the invention.

DRAWINGS

The drawings form part of the specification hereof. In the drawings, in which like numerals refer to like features and which are not necessarily drawn to scale, the following is briefly noted:

FIG. 1 is a perspective view of the invention, embodied in a full flow connector.

FIG. 2 is a cut-away view of the connector of FIG. 1.

FIG. 3 is a perspective view of the invention, embodied in a full flow, quick-disconnect, swivel coupling suitable for helix-backed vinyl hose with a handle locking device.

FIG. 4 is a cut-away view of the coupling of FIG. 3.

FIG. 7 is a top view of the invention, embodied in a handle locking device attached to a standard coupling.

FIG. 8 is a right side view of the device of FIG. 7.

FIG. 9 is a left side view of the device of FIG. 8.

FIG. 10 is a bottom plan view of the device of FIG. 8.

FIG. 11 is a rear, upside down view of the device of FIG. 8.

FIG. 12 is a cut-away, upside down view of the device of FIG. 8, taken along A—A as depicted in FIG. 10.

FIG. 13 is a cut-away, upside down view of the device of FIG. 8, taken along B—B as depicted in FIG. 10.

FIGS. 14-1 through 14-4 are views of an inside-out hose cutting saw of the invention.

ILLUSTRATIVE DETAIL

The invention is further illustrated with the following detail, which generally may be taken in conjunction with the drawings, and is not to be construed as limiting in nature.

Figures 1, 14:
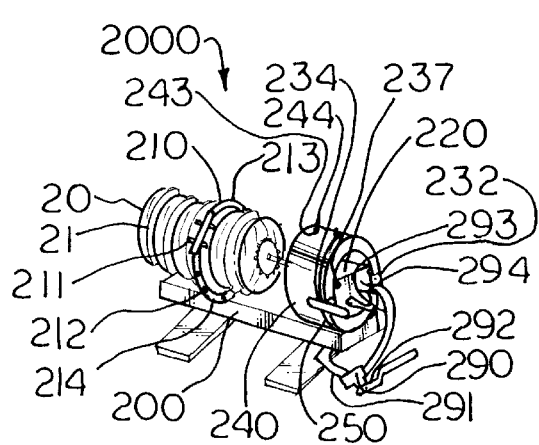
Figures 2, 14:
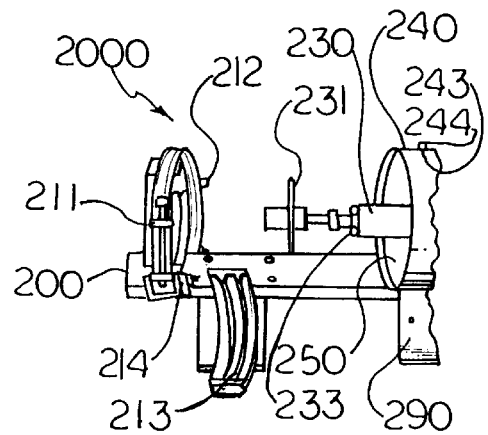

With reference to FIGS. 1 & 2 (connector) and 3 & 4 (coupling), connector/coupling article 100C (connector) and 100Q (quick-disconnect coupling) connects conduit 20, for example, a four-, five- or six-inch inside diameter vinyl hose 20V (FIGS. 3, 4 & 6) with a helical external protrusion 21 of vinyl, e.g., TIGER FLEX WT-400 hose with a left-hand helix, and/or another conduit passageway such as stainless steel piping or hose 20S (FIG. 5), entrance to a reactor or storage tank, and so forth.

The connector/coupling 100C, 100Q has hollow housing 30, for example, of stainless steel. Hollow inside passageway 31 for throughput of a substance corresponds to the inside diameter of the hose or conduit 20, for example the vinyl hose 20V or stainless steel hose 20S and recess 32 with hose stop 33 is on the inside of the housing. Gasket material 22, for example, GORE-TEX expanded polytetrafluoroethylene joint sealant, which may be made under one or more of U.S. Pat. Nos. 3,953,566 and 4,187,390, may be placed between the inserted end of the hose and the stop 33 for a more secure seal. Mating face 34 may have male protrusion 35 or corresponding female depression 36 for mating with a corresponding connector 100C (FIG. 2) or part of coupling 100Q (FIG. 4).

Collar 40, for example of steel or aluminum, wraps around the hose has an internally-directed protrusion 41 which is capable of engaging the conduit 20, for example, the vinyl hose 20V or stainless steel hose 20S, and/or an external protrusion 21 thereof. The collar 40 may be in two or more pieces 42 fastened by annular fasteners 43 such as bolts screwed into a tapped hole of one piece 42.

Means 50 for fastening the collar 40 to the housing 30 hold the same together. For example, the means 50 may be a steel bolt, 51 screwed into a tapped hole 37 of the housing 30 (FIG. 2) or into a tapped hole 37 of an axially-fastening aluminum ring 60 which may have an L-shaped recess 61 to nest securely with external shoulder 39 of the housing 30 (FIGS. 2 & 4). Other fasteners such as clips, pins, twisted wires, wedges, glue and so forth may be suitable.

Two connectors may be fastened together with similar means or even laboratory-style, horseshoe-shaped clips, and so forth. However, advantageously employed are two other axially-fastening aluminum rings 62, which may retain a rectangular or square cross section in part may be employed as the fasteners, which may be held together by steel bolts 63 screwed into tapped holes 64 of one or both of such rings 62 (FIG. 2).

Figure 5:
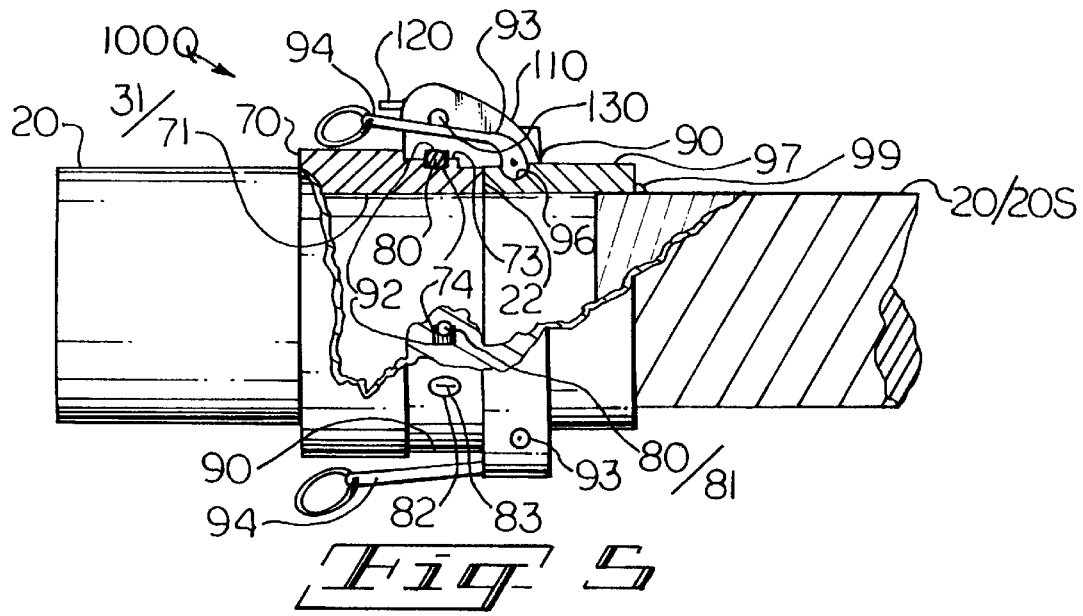
FIG. 5 is a side, partial cut-away view of the invention, embodied in a full flow, quick-disconnect, swivel coupling especially for a stainless steel hose.

Continuing on, and with reference to FIGS. 3–6, coupling 100Q is of the quick-disconnect variety, for connection of conduit or hose 20 such as the vinyl hose 20V (FIGS. 3, 4 & 6) or steel hose 20S (FIG. 5).

The quick-disconnect coupling 100Q has a stainless steel housing 30 which functions as a receiving piece 70. Hollow inside passageway 31 is again for throughput of a substance, and it goes through and in part makes up passage portion 71. Receiving end 72 generally has, at least on its outside, a generally cylindrical surface 73 with a groove 74 therein. The groove 74 is of a width and depth capable of receiving a stopping object or device 80. The relationship between the groove 74 and the stopping object 80 is such that a part of the object 80 resides above the outside surface 73.

Stainless steel swivel collar 90 has a generally cylindrical receiving piece mating surface 91 with a groove 92 therein of a width and depth capable of receiving at least a portion of the part of the stopping object 80 which resides above the outside surface of the receiving piece 70. The collar 90 also has a connect device 93 such as a standard cam-and-groove handle 94 and cam 95 part capable of interacting with a suitable groove 96 on the outside of received piece 97, to fasten to the receiving piece 70.

Figures 3, 14:
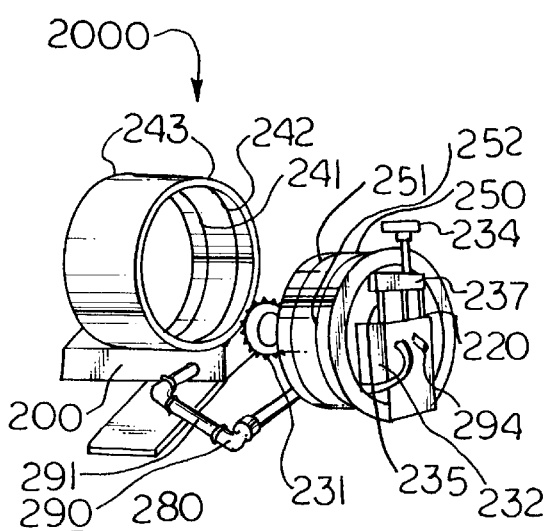
Figures 4, 14:
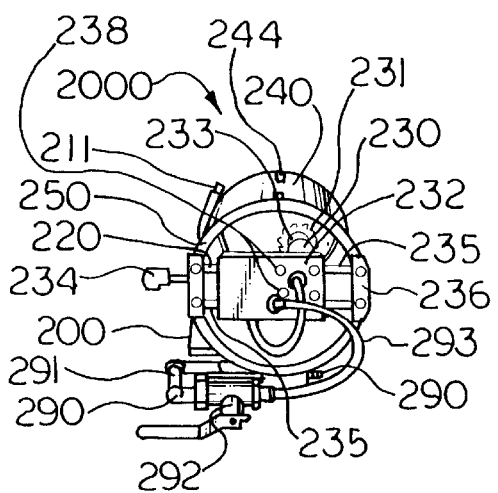

As depicted in FIGS. 3–5, the received piece 97 may be connected to a further piece or conduit 20 or vessel and so forth by suitable means such as two other axially-fastening aluminum rings 65, which may have L-shaped recesses 66 therein to nest with shoulders 98. The rings 65 may be held together by steel bolts 63 screwed into tapped holes 64 of one or both of such rings 65 (FIG. 4) of by alternatives to include as aforementioned. As another suitable alternative, for example, in the case of the stainless steel hose 20S, weld 99 may hold the hose 20S to the received piece 97 (FIG. 5).

The stopping device 80 can be, for example, a steel ball bearing 81. Preferably, a plurality of steel ball bearings 81 fill the grooves 74 & 92 when the grooves are mated. The ball bearings can be inserted through access hole 82 when the grooves are mated during assembly of the receiving piece 70 and swivel collar 90, and plug 83 can be screwed into the tapped access hole 82 to keep the ball bearings 81 in place. Other stopping devices 80 such as a spring ring akin to a piston ring, a resilient, helically-coiled "snake," and so forth, may be employed, but the ball bearings 81 have the distinct advantage of being easily insertable and removable so as to facilitate ready assembly and disassembly of the receiving piece 70 with the swivel collar 90.

Gasket material 22, for example, the aforementioned GORE-TEX expanded polytetrafluoroethylene joint sealant, may be placed between mating faces for a more secure seal.

Figure 6:
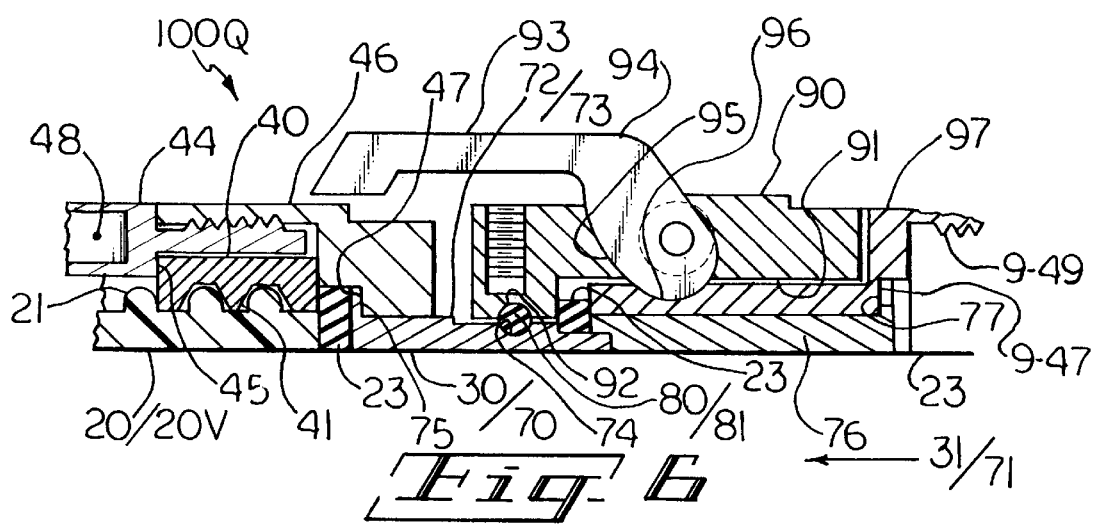
FIG. 6,is a cut-away view of a portion of another embodiment of the invention, including a one-piece collar.

With particular reference to FIG. 6, the coupling 100Q includes one-piece securing collar 40 of aluminum, which can screw onto the helical protrusions 21 of PVC hose 20V by means of inside collar protrusions 41. First end of the device has the one-piece securing collar 40 illustrated, and it can be secured to the remaining part of the coupling by a male-threaded back up ring 44 of aluminum, with shoulder 45, which is screwed into the correspondingly female-threaded outer ring 46 of aluminum, which has shoulder 47. Hole 48, for example, a ⅜-inch hole, for a spanner wrench to assist in securing the coupling in assembly and disassembly is also depicted. Base or housing 30 of stainless steel functions as a receiving piece 70. Again, hollow inside passageway 31 is for throughput of a substance, and it makes up part of passage portion 71. As before, receiving end 72 generally has, at least on its outside, a generally cylindrical surface 73 with a groove 74 therein. The groove 74 is of a width and depth capable of receiving a stopping object 80 such as chrome steel ball 81. Again, part of the stopping object 80 in groove 74 resides above outside surface 73. Shoulder 75 cooperates with shoulder 47 to hold the coupling together. Swivel collar 90 of stainless steel has a generally cylindrical receiving piece mating surface 91 with a groove 92 therein of a width and depth capable of receiving at least a portion of the part of the stopping object/ball 80/81 which resides above the outside surface of the receiving piece 70. Connect device 93 is present to reversibly connect the pieces together. A standard cam-and-groove connect device 93 (FIG. 6) may be provided. Such could include handle 94, and cam 95 for locking in corresponding groove 96 of received piece 97.

The received piece 97 (FIG. 6) has shoulder 9-47 to cooperate in securing piece 76 of base 30/70 of stainless steel through shoulder 77. This received piece 97 may be connected to a further piece on a second end of the device in like manner to the attachment of the one-piece securing collar 40 on the first end of the device, by means of a cooperating thread arrangement of which female set 9-49 is depicted in FIG. 6. Hose, other conduit, or vessel may be attached in a similar manner as depicted for the first end.

Gaskets 23 of a rubber material are placed between mating faces for a more secure seal. See again, FIG. 6.

Further, in general, some characteristics of certain preferred embodiments of the invention are noted as follows:

1) When a hose is dropped on line, ready for installation, coupling handles may not be in the best orientation to connect to the adapter on the other hose. In normal use of other couplings the hose is rotated to orient the handles, which puts an undesirable torque stress on the hose. The present coupling can employ a ball groove and a number of metal balls therein, holding the outer portion of the coupling—with the handles—to the inner portion—the stem. When the handles are picked up, the balls allow the outer portion—with handles—to rotate, putting the coupling and the adapter into proper orientation without putting stress on the hose.

2) With standard couplings on the market, if there is a requirement for stainless steel, stainless is used—for the entire coupling—even if it is only required for the passageway. This adds cost and weight. The present connector/coupling includes availability in in aluminum as well as stainless steel, but it is also available in mixed materials construction such as of aluminum with a stainless steel liner in the passageway. This cuts both cost and weight.

3) Unlike split ring hose clamps, which are known to be used to mount hose to stem-containing coupling items, the collar, to especially include one-piece securing collar, does not function to clamp the hose but is a securing device to draw the hose into the coupling to seal it against the seal inserted into the coupling. In addition, the securing collar is inserted into the coupling, in preferred embodiments—entirely—so that nothing of it is seen outside the coupling. In principle, such a collar does not act as a clamp.

Continuing on, and with reference to FIGS. 3–5 & 7–13, handle locking device 1000 includes a support 110 to which moving parts of the device are mounted. The support may be, for example, of metal (FIGS. 3–5) such as aluminum or steel, and especially of the same metal as the swivel collar 90 and so forth or of a metal compatible for welding thereto, or it may be of a suitably strong plastic (FIGS. 7–13).

Lever handle 120 is mounted on the support 110 through pivot pin 121 so that the handle 120 can pivot thereabout. The lever handle 120, for example, of aluminum or suitable plastic, has an actuating end 122, and it may have an exposed actuated end 123, for example, to be actuated by finger pressure, which may protrude through orifice 111 of the support 110 when the support is fashioned as a covering type. As alternatives to manual activation, the lever handle 120 actuating end 122 may be actuated by a motor, electromagnet, and so forth, provided within or on the outside of the support 110, which embodiments may not require an exposed actuated end 123.

Steel locking pin 130 is supported by and protrudes from support 110 and can be drawn back toward the support 110 by activating the lever handle 120 so as to cause its actuating end 122 to draw back the pin 130. The locking pin 130 is capable of protruding enough so as to extend over a lowered receiving handle 94 of a coupling such as the coupling 100 (FIGS. 3–5) or a standard cam-and-groove coupling 25 for hose (FIG. 7). The pin may have a flat bottom 131 to help insure that the locked in handle 94 does not come undone except when desired, and it may also have a top ramp 132 to facilitate automatic locking of the device as the same will cause the pin 130 to be pushed back when handle 94 is being closed, until the handle 94 passes by. Spring recess 133 loaded with spring 134 help insure that the pin 130 pushes out and locks the handle 94 automatically and remains closed until it is opened, as desired.

The device 1000 may be fitted with a standard coupling 25 (FIG. 7). Handle pin hole 140 can be provided in the support 110. A standard-sized coupling handle pin 141 can be inserted through the hole 140 and the hole in the handle 94, and be secured, for example, with nut 142, to fit the device 1000 with standard-sized couplings. A thinner handle 94 may be provided in conjunction therewith.

Continuing further, and with particular reference to FIGS. 14-1 through 14-4, inside-out hose saw 2000 can include a frame 200 and a saw clamp 210 derived from a standard-make, split-ring helix groove clamp, which has a helix groove machined into its inside diameter for registry with the hose 20 helix 21.

The known purpose of the standard-make, split-ring helix hose groove clamp is to allow the clamp to form around the hose so that it can clamp the hose evenly to an inserted stem. Such known clamp is split and has one or two bolts to secure the clamp to the hose. The known purpose of the split is so that the clamp, attached outside a standard coupling, would clamp down on the hose, forcing it to squeeze down on the stem that had been inserted.

In general, the same principle is used in the saw clamp 210 part (there being no coupling stem of course) of the saw 2000. With the saw clamp 210 is included four pieces: T-bolt clamp 211; split two-piece hose collar 212, 213 machined to fit the the helix of the hose; and housing 214 to fit the bottom half 212 of the helix hose collar. The top half 213 of the helix collar is put in place, and the T-bolt clamp 211 is placed around both parts 212 & 213. Clearance is provided at the bottom of the secured collar for the T-bolt clamp 211; the hose 20 is screwed in the desired amount to cut, and the clamp 211 is tightened to secure the hose. The housing 214 is secured to the base 200, which serves as the frame or part thereof. Mounted to and part of the frame, on a member 220 thereof, is radial cutting arm 230, which has a saw blade 231 in appropriate cutting contact with the hose 20 from the inside thereof, which can be moved radially in relation to the mounted hose. This may be accomplished, for example, with a metal two-piece barrel 240 and cylinder 250 arrangement. Two grooves 241, 242 are in an inside portion of the barrel 240, and, corresponding thereto, two grooves 251, 252 are in an outside portion of the cylinder 250. The cylinder 250 is positioned inside the barrel 240 and is secured by two rows of steel balls 280 as stopping devices, one row to be in each of the groove sets 241-251 & 242-252, respectively. Openings 243 secured by socket head screws 244 serve as access ports, with the screws serving as plugs, for the balls 280. The balls 280 are fed through these openings when the barrel and cylinder grooves are in registry, and then the screws 243 are inserted to keep the balls in place and provide an axially-stopped but smoothly-rotating barrel and cylinder arrangement. The barrel 240 is secured to the base 200 or frame, for example, with two socket head screws (not shown). Air flow lines 290 can be employed to provide pneumatic power for the saw blade 231. The air enters from the back side, travels through the base 200 and along copper pipe 291 portion, and to valve 292. When the valve is opened, air travels through the hose 293 to a live swivel 294 in cross-drive element 232 of the arm 230. Hose attached to the front of the cross drive 232, is brought back through the cross drive, and is attached to the inlet of a die grinder 233 which serves as part of the arm 230. The die grinder operates the saw blade 231. Alternatively, an air line from the valve may go to the swivel which is attached directly to the die grinder part. Other means for powering the cutting element, for example, saw blade 231, may be employed such as by substituting another gas or gas mixture for air; employing hydraulic flow, for example, as by water flow; employing an electrically powered motor, an internal combustion engine, a piston driven steam engine, a fuel combustion turbine engine; and so forth. In lieu of the saw blade 231, a laser cutting element may be employed, as well as may other mechanical elements such as router bits and so forth. In the preferred embodiment shown, the die grinder is secured to the cross drive, and the saw blade is attached to the far end of the die grinder. The cross drive is designed to be moved back and forth by means of screw handle 234. By screwing the handle 234 clockwise, the cross drive is moved away therefrom, which in turn moves the blade 231 into the hose 20. The cross drive slides on two ⅜-inch steel rods 235, which in turn are secured to the cylinder 250 at the side near the die grinder action, i.e., side 236. At the handle side 237, the rods are slip fit. No springs need be provided for return of the cross drive. The drive handle 234 can be pinned to the cross drive, and when reversed by counter-clockwise turning of handle 234, the cross drive 232 is returned to its neutral position. Bolts 238 mount the die grinder to the cross drive. One of the bolts 238 is not symmetrical with the remaining bolts 238 for clearance purposes in assembly. A holder (not shown) is present to help secure the round die grinder to the cross drive. The die grinder holder is round with one side milled flat so that it will go up to the wall of the cylinder. This helps to keep the overall size of the unit small. To prevent a person from taking the unit apart and not putting it back together properly, the hole pattern has one hole some fifteen degrees off square so that the unit can be assembled properly in only one manner.

A good, square cut is most desirable in helical hose employed with the connectors/couplings of the invention, and the saw 2000 provides it. The saw 2000 has numerous advantageous characteristics, which include the following:

1) It is portable.
2) It locks helical hose in place.
3) It cuts from inside out so that the helix does not adversely affect the cut.
4) It cuts the hose in a circumference to obtain a straight cut across the hose. This can be accomplished even in the field.

A number of different materials may be used to make the invention. Thus, for example, various metals may be used, and suitable engineering plastics may be substituted for one or more metal components, as may be appropriate or desired, in the instant connector, coupling, handle, or saw.

CONCLUSION

The present invention is thus provided. Numerous modifications can be effected within its spirit, the literal claim scope of which is particularly pointed out as follows:

I claim:

1. A quick-disconnect coupling for connection of conduit, at least a part of which conduit is a helical hose, which coupling comprises a receiving piece having a hollow passageway for throughput of a substance, a passage portion and a receiving end, on the outside about the receiving end there being a generally cylindrical surface with a groove therein of a width and depth capable of receiving a stopping object of at least one ball bearing, the same being such that a part of the object resides above the outside surface; a swivel collar having a generally cylindrical receiving piece mating surface with a groove therein of a width and depth capable of receiving at least a portion of the part of the stopping object which resides above the outside surface of the receiving piece; a connect device attached to the swivel collar capable of holding a received piece to the receiving piece; as part of the receiving piece, a collar for securing the helical hose, which collar includes internally directed protrusions for engaging external helix portions of the helical hose and pulling the hose in an axial direction in conjunction with means for fastening the collar to the receiving piece, and the stopping object, which can facilitate ready assembly and disassembly of the receiving piece with the swivel collar.

2. The coupling of claim 1, wherein the collar for securing the helical hose is a two-piece collar fastened by annular fasteners.

3. The coupling of claim 2, which is made to include a plurality of different metal substances.

4. The coupling of claim 3, wherein the stopping object includes a plurality of ball bearings, which can be inserted and removed from external the coupling; and a plug for keeping the stopping object in place in the groove is present.

5. The coupling of claim 2, wherein the stopping object includes a plurality of ball bearings, which can be inserted and removed from external the coupling; and a plug for keeping the stopping object in place in the groove is present.

6. The coupling of claim 1 wherein the collar for securing the helical hose is a one-piece collar.

7. The coupling of claim 6, which is made to include a plurality of different metal substances.

8. The coupling of claim 7, wherein the stopping object includes a plurality of ball bearings, which can be inserted and removed from,external the coupling; and a plug for keeping the stopping object in place in the groove is present.

9. The coupling of claim 6, wherein the stopping object includes a plurality of ball bearings, which can be inserted and removed from external the coupling; and a plug for keeping the stopping object in place in the groove is present.

10. The coupling of claim 1, wherein the connect device includes a handle pivotally attached on the swivel collar with a handle pin, which handle can be lowered to secure the swivel collar to the received piece; and fitted with the coupling is a handle locking device, which handle locking device includes a support; a lever handle pivotally mounted on the support, the lever handle having an actuating end; and a locking pin, which protrudes from the support and can be drawn back toward the support by activating the lever handle so as to cause the actuating end of the lever handle of the handle locking device to draw back the locking pin, the locking pin being capable of protruding enough so as to extend over the lowered receiving handle of the coupling to lock the lowered receiving handle of the coupling in the lowered position.

11. The coupling of claim 10, wherein there is a hole in the support through which hole the handle pin passes, fitting the handle locking device to the coupling thereby.

12. The coupling of claim 11, wherein the stopping object includes a plurality of ball bearings, which can be inserted and removed from external the coupling; and a plug for keeping the stopping object in place in the groove is present.

13. The coupling of claim 10, wherein the stopping object includes a plurality of ball bearings, which can be inserted and removed from external the coupling; and a plug for keeping the stopping object in place in the groove is present.

14. The coupling of claim 1, wherein the stopping object includes a plurality of ball bearings, which can be inserted and removed from external the coupling; and a plug for keeping the stopping object in place in the groove is present.

* * * * *